Feb. 20, 1968 O. CESAREO 3,370,270

INFORMATION CHECKING SYSTEM

Filed April 10, 1963 3 Sheets-Sheet 1

INVENTOR
O. CESAREO
BY Lucian C. Canepa
ATTORNEY

Feb. 20, 1968 O. CESAREO 3,370,270

INFORMATION CHECKING SYSTEM

Filed April 10, 1963 3 Sheets-Sheet 2

Feb. 20, 1968 O. CESAREO 3,370,270

INFORMATION CHECKING SYSTEM

Filed April 10, 1963 3 Sheets-Sheet 3

3,370,270

INFORMATION CHECKING SYSTEM

Orfeo Cesareo, Washington Township, Bergen County, N.J., assignor to Bell Telephone Laboratories, Incorporated, New York, N.Y., a corporation of New York
Filed Apr. 10, 1963, Ser. No. 272,110
12 Claims. (Cl. 340—146.1)

This invention relates to information processing systems and more particularly to such systems in which signals sent from a transmitting station to one or more receiving stations are checked to determine whether the received signals are accurate representations of those transmitted.

In even the most carefully designed and constructed information processing system there is a possibility that signals which are transmitted from a first to a second location will be registered at the second location in a form which is not exactly representative of that transmitted. Therefore, such systems commonly include circuitry for checking certain characteristics of the received information signals to determine whether or not the received signals correspond to the transmitted ones.

In an information processing system in which a transmitter is connectably related to a plurality of receivers via a transmission path, it is often the practice to associate a checking circuit with each individual receiver. Thus, when a connection is effected between the transmitter and a particular receiver, the checking circuit associated with the particular receiver is also connected in the system. Consequently, as the number of connectable receivers in the system increases, the number of checking circuits included in the system also necessarily increases. In accordance with this approach, the amount of checking circuitry required in a system that comprises a relatively large number of receivers is undesirably large.

Accordingly, an object of the present invention is an improved information processing system.

More specifically, an object of this invention is an improved information processing system of the type that checks certain specified characteristics of signals registered therein.

Another object of the present invention is a reliable and efficient system in which the checking of received information signals is performed in a manner that requires a minimum of checking circuitry.

These and other objects of the present invention are realized in a specific illustrative embodiment thereof that includes a transmission path capable of propagating information signals therealong. Connected to the respective ends of the transmission path are two sets of parallel-arranged gate circuits, an information transceiver (i.e., a circuit that is capable of functioning as either a transmitter or a receiver of information signals) being respectively connected in series with each gate circuit. Coupled to the transmission path via another gate circuit is a checking circuit.

In operation a selected one of the transceivers functions as a transmitter, sending information signals through its enabled gate circuit to one end of the transmission path. Illustratively, a particular one of the gate circuits located at the other end of the transmission path is also enabled whereby the transmitted signals are supplied to the transceiver associated with the second-mentioned enabled gate circuit. In this way information signals are transmitted between selected transceivers via two enabled gate circuits.

Subsequently, the gate circuit associated with the selected transmitting transceiver is disabled and the gate circuit intermediate the transmission path and the checking circuit is enabled. As a result the checking circuit is directly conected to the selected receiving transceiver via two enabled gate circuits whereby the information signals registered in the receiving transceiver are then checked by the checking circuit. Lastly, the gate circuits associated with the checking circuit and the selected receiving transceiver are disabled and the system is then again in its initial condition, ready for the establishment therein of another connection between selected transceivers.

It is emphasized that the single aforementioned checking circuit serves to check signals sent over the transmission path irrespective of which transceivers are connected to the path for a particular transmission. In other words, the checking circuit and its gate circuit are associated with the transmission path rather than with any particular one of the plurality of transceivers connectable thereto. Thus, regardless of the number of transceivers that are connected in sequence in pairs to the respective ends of the transmission path, only one checking circuit is required to check each group of received signals.

Advantageously, the principles of the present invention are embodied in an illustrative system which includes a bidirectional transmission path. By selective actuation of the gate circuits of such a novel system, a single checking circuit is capable of checking information signals which are sent to either end of the transmission path.

In accordance with other aspects of the principles of the present invention, one transceiver may be arranged to transmit signals simultaneously to a number of receiving transceivers. Then, by disabling the gate circuit associated with the transmitting transceiver and selectively actuating the gate circuits associated with the receiving transceivers, the single checking circuit may be utilized to perform checks in sequence on the information signals registered in the plurality of receiving transceivers.

If, on the other hand, information signals are transmitted to a plurality of receiving transceivers and it is then required that the plural groups of received signals be checked simultaneously, other checking circuits are included in the system such that each of the plurality of receiving transceivers has a checking circuit associated therewith. In acordance with the principles of this invention, however, each of these additional checking circuits is capable not only of checking the noted associated receiving transceiver but as many other receiving transceivers as are connectable to the path to which the checking circuit is coupled via its gate circuit.

Thus, an illustrative system made in accordance with the principles of the present invention includes a transmission path having one end connectable to a transmitter and having the other end thereof connectable to a plurality of receivers. Further, the illustrative system includes a single checking circuit connectable to the path for checking the signals transmitted to any of the plurality of receivers.

It is accordingly a feature of the present invention that a single checking circuit be connectable to a transmission path for checking signals sent via the path from a transmitter to one or more of a plurality of receivers.

It is another feature of this invention that a checking circuit be connectable to a bidirectional transmission path for checking signals sent via the path to one or more of a plurality of receivers that are connectable to either end of the path.

It is still another feature of the present invention that two sets of parallel-arranged gate circuits be connectable to the respective ends of a transmission path, that a transceiver be connectable in series with a different one of each of the gate circuits, and that a single checking circuit be connectable to the path via another gate circuit.

It is yet another feature of this invention that an information processing system include two sets of transceivers connectably associated through respective gate circuits with the ends of a bidirectional path, that a single checking circuit be capable of being coupled to the path via a checking gate circuit, and that a first gate circuit associated with a first transceiver at each end of the path be capable of being enabled to allow the first transceiver at one end of the path to supply information signals to the first transceiver at the other end of the path whereby the subsequent disabling of the first gate circuit at the one end and the enabling of the checking gate circuit permit the checking circuit to check the information signals registered in the first transceiver at the other end of the transmission path.

A complete understanding of the present invention and of the above and other features and advantages thereof may be gained from a consideration of the following detailed description of several illustrative embodiments thereof presented hereinbelow in connection with the accompanying drawing, in which.

Figure 1:
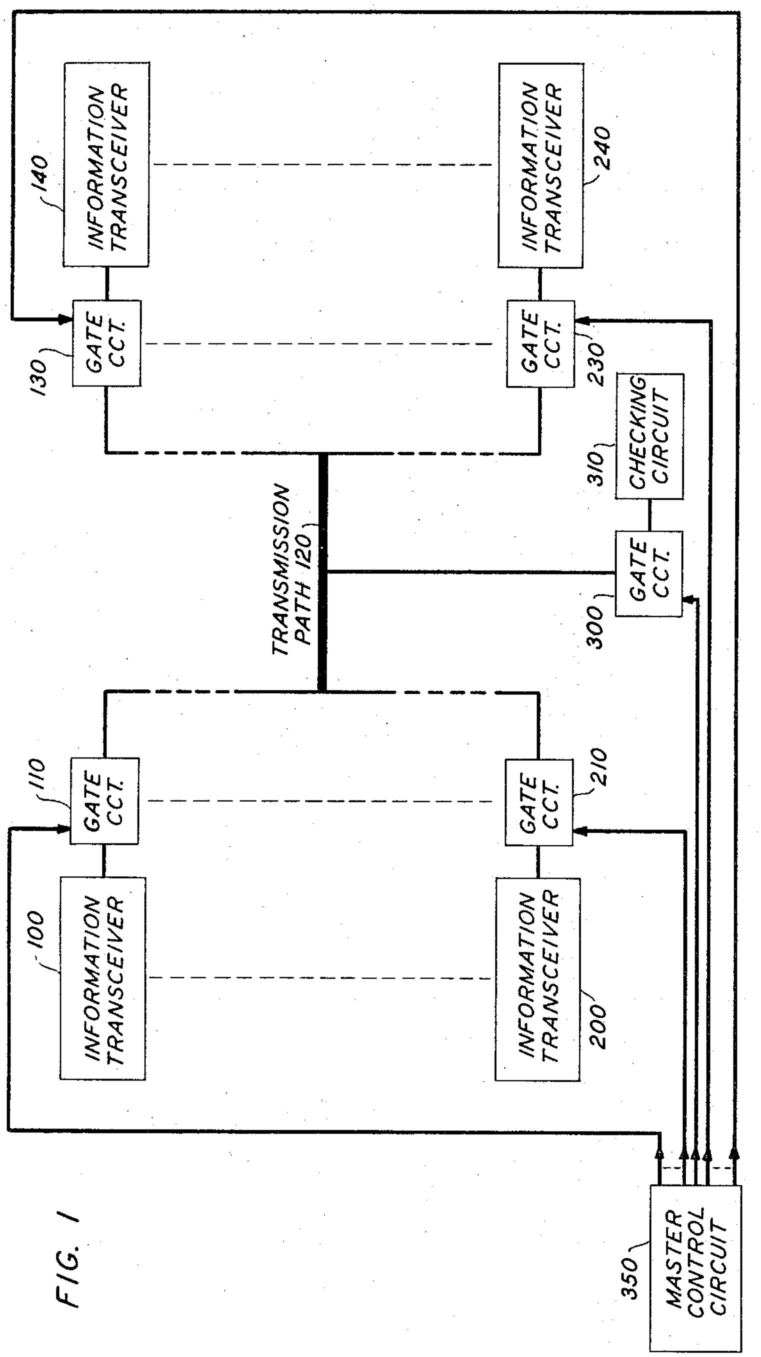
FIG. 1 depicts in generalized form one illustrative embodiment of an information processing system made in accordance with the principles of the present invention.

The illustrative system shown in FIG. 1 includes a transmission path 120. Advantageously the path 120 is of the type that is capable of propagating signals either from left to right or right to left. Although, for illustrative purposes, the path 120 is schematically represented in FIG. 1 as comprising a single solid conductor, the bidirectional path 120 may, in fact, comprise any suitable transmission medium such as, for example, a multiwire line or a radio-type transmission link.

Connected in a parallel arrangement to the left-hand end of the transmission path 120 shown in FIG. 1 are a plurality of gate circuits 110 . . . 210, and respectively connected in series with these gate circuits are a plurality of information transceivers 100 . . . 200. Similarly, a plurality of gate circuits 130 . . . 230 are connected in a parallel array to the right-hand end of the path 120, and a plurality of information transceivers 140 . . . 240 are respectively connected in series with these gate circuits 130 . . . 230. In addition, the illustrative system includes a gate circuit 300 connected intermediate the transmission path 120 and a checking circuit 310. Quiescently each of the aforementioned gate circuits is in a disabled or open-circuited condition. During operation of the system, however, the gate circuits are enabled or closed in a predetermined sequence, as described hereinbelow, in response to control signals supplied thereto by master control circuit 350.

A typical cycle of operation for the illustrative system shown in FIG. 1 involves selectively enabling two gate circuits to complete a path between two particular transceivers. Assume, for example, that the gate circuits 110 and 130 are enabled and that information signals are then sent from the transceiver 100 to the transceiver 140. Subsequent to the registration of the transmitted information signals in the transceiver 140, the gate circuit

110 is disabled and the gate circuit 300 is enabled whereby the checking circuit 310 is directly connected to the transceiver 140 for checking the received information signals registered therein. As is well known in the art, the checking performed by the circuit 310 may simply involve a check on the plausibility of the received signals or, if desired, may involve actually checking the accuracy of the received signals. More generally, the circuit 310 may be adapted to check any specified characteristic of the received information signals. Illustratively, the circuit 310 may include an indicator for providing a suitable manifestation that the received signals correspond or not in some checked respect with their originally transmitted counterparts.

Figure 2:
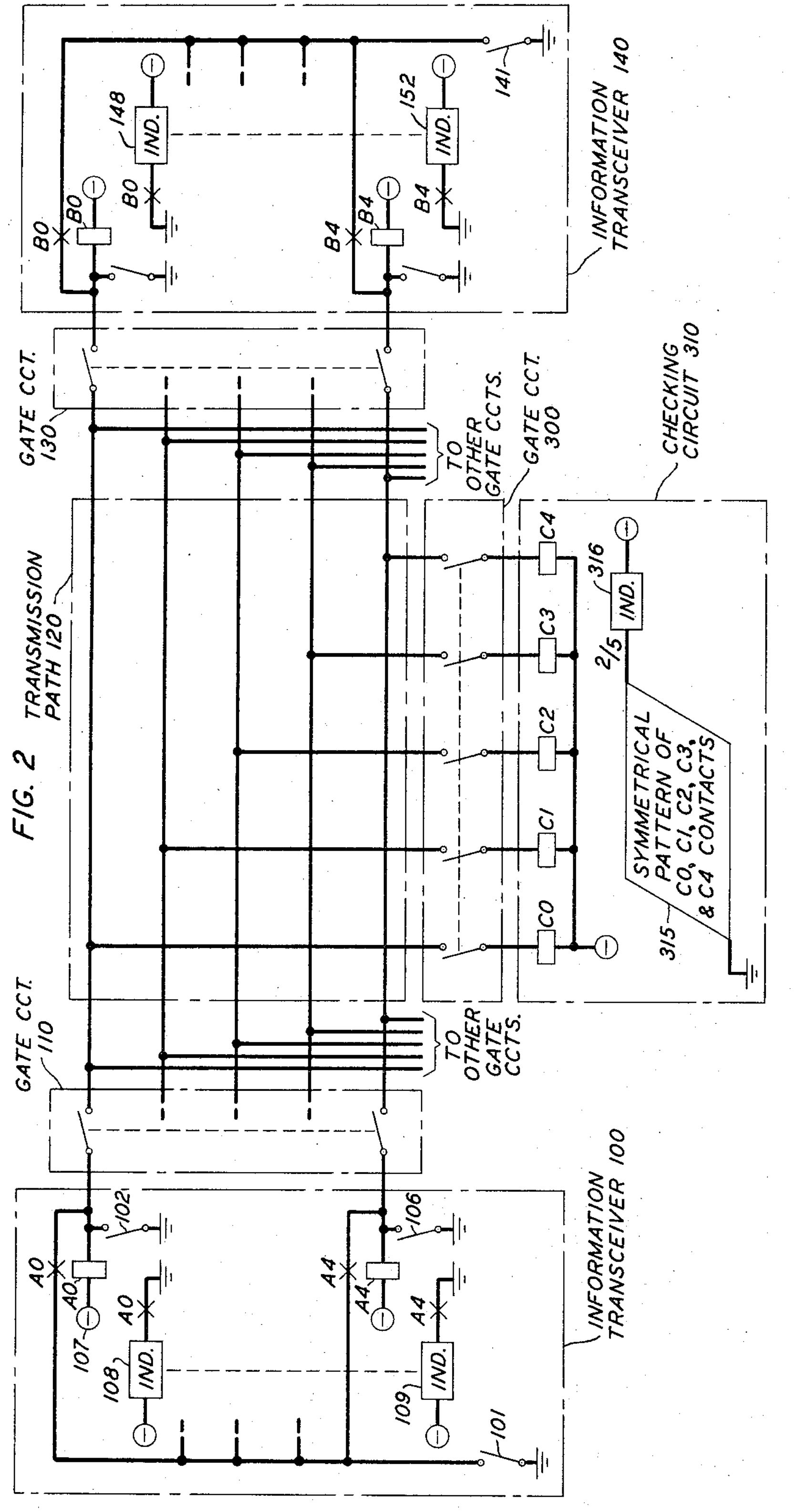
FIG. 2 shows a specific implementation of a portion of the system illustrated in FIG. 1.

In the interests of completeness and clarity, FIG 2 illustrates in detail one specific manner of implementing the transceivers 100 and 140, the gate circuits 110, 130 and 300 and the checking circuit 310. For illustrative purposes it is assumed in the FIG. 2 arrangement that information signals are represented in the well known two-out-of-five combinational code form. Hence, the transmission path 120 is shown in FIG. 2 as including five parallel wires, only two of which at the most are energized at any one time. It is further assumed in FIG. 2 that the checking circuit 310 performs simply a plausibility-type check on the received information signals. In other words, if the received signals are ascertained by the circuit 310 to be registered in a receiving transceiver in a two-out-of-five representation, it is assumed that the received representation is a plausible counterpart of the originally transmitted signals.

Illustratively, each of the information transceivers 100 and 140 and the checking circuit 310 shown in FIG. 2 includes five relays. These relays and their associated contacts are represented in FIG. 2 in accordance with the well known detached contact mode of depiction which, for example, is described in an article by F. T. Meyer entitled "An Improved Detached-Contact-Type of Schematic Circuit Drawing," which was published in the A.I.E.E. Transactions, Communication and Electronics, No. 20, pp. 505–513, September 1955. In addition, the gate circuits 110, 130 and 300 are shown in FIG. 2 as comprising five manually operable single-pole, single-throw switches. Such a simple specific embodiment will serve adequately to demonstrate the basic mode of operation of the illustrative arrangement shown in generalized form in FIG. 1.

Assume that the transceiver 100 shown in FIG. 2 is to act as a transmitter, that the transceiver 140 is to serve as a receiver and that a two-out-of-five signal representation is to be transmitted therebetween. Assume further that the particular signal representation to be transmitted is to be of the form in which the top-most and the bottommost of the wires of the path 120 are energized.

The information transceiver 100 may be arranged to transmit the particular two-out-of-five representation mentioned above by closing an OFF NORMAL switch 101 and then momentarily closing signal switches 102 and 106. Closing the switch 102 completes a path between ground and a negative source 107 for a relay coil A0 whereby the coil A0 is energized and causes its normally open contacts A0 to close. One set of these normally open contacts A0 completes a locking path for the coil A0 to maintain it energized as long as the OFF NORMAL switch 101 remains closed, and the other set of normally open contacts A0 closes to complete a circuit through an indicator 108. Similarly, momentary closure of the switch 106 locks up a relay coil A4 and energizes its associated indicator 109. In this way the transceiver 100 is prepared to transmit a particular two-out-of-five representation to a remote location.

The configuration of the information transceiver 140 is identical to that of the previously described transceiver 100. The transceiver 140 is enabled to receive information signals from the transmitting transceiver 100 by closing an OFF NORMAL switch 141 therein. Then the transmission path 120 is connected to the transceivers 100 and 140 by enabling (i.e., closing) all the switches in the gate circuits 110 and 130. As a result, the left-hand ends of relay coils B0 and B4 in the transceiver 140 are grounded and the coils thereby energized. Consequently, each of these coils locks up through one of its associated make contacts and, in addition, energizes an indicator associated therewith through its other make contacts. If the particular herein-assumed two-out-of-five representation is correctly received by the transceiver 140 and registered in the relays thereof, the indicators 148 and 152 in the receiving transceiver 140 will be energized.

The plausibility of the information signals registered in the transceiver 140 is checked by opening all the switches in the gate circuit 110 and then closing all the switches in the checking gate circuit 300, whereby relay coils C0, C1, C2, C3 and C4 in the checking circuit 310 are respectively connected to the five wires of the transmission path 120. In the particular example considered herein, the relay coils C0 and C4 are thereby energized and their respective contacts actuated. The contacts of the relay coils C0 through C4 are connected in a well-known symmetrical pattern (of the type described, for example, in the aforecited Meyer article), which pattern provides an output if, and only if, two of the five relay coils C0 through C4 are energized at any one time. This symmetrical pattern of contacts is depicted in FIG. 2 in symbolic form, being designated by reference numeral 315. The pattern 315 serves in effect to ground the left-hand end of an indicator 316 in the checking circuit 310 if two-out-of-five of the relay coils C0 through C4 are energized. In this way the indicator 316 is energized if the information signals registered in the transceiver 140 are in a plausible form (i.e., if they are in the originally transmitted two-out-of-five mode of representation). In the specific case considered herein, only the two coils C0 and C4 are energized and the pattern 315 therefore serves to energize the indicator 316 to provide a positive manifestation in the illustrative system that the received signals are in the proper code form.

At the completion of the afore-described checking operation the gate circuits 130 and 300 shown in FIG. 2 are disabled. Then the OFF NORMAL switches 101 and 141 in the transceivers 100 and 140, respectively, are opened whereby the relays therein are released and the illustrative system is returned to its quiescent condition, ready to have initiated therein another complete cycle of operation of the same type described above. In subsequent cycles information signals may again be sent from left to right along the transmission path 120 or, alternatively, the signals may be transmitted in the opposite direction between any two selected transceivers. Regardless of which pair of transceivers are temporarily connected to the path 120 for a particular transmission, the single checking circuit 310 and its associated gate circuit 300 are utilized in every instance to check whatever signals are transmitted along the path.

In addition, it is noted that the checking circuit 310 may be suitably modified and connected to the transmission path 120 via the gate circuit 300 during quiescent periods of the illustrative system shown in FIG. 2 thereby to perform an additional function. During such periods the gate circuits connected to the respective ends of the path 120 are all disabled and the checking circuit 310 may then be utilized to check the transmission path 120 for the presence of ground faults thereon. The only modification required of the specific checking circuit 310 shown in FIG. 2 is that the symmetrical pattern 315 thereof be provided with an additional output lead which is connectable to ground if any one or more of the associated relay coils C0 through C4 is energized. The details of such a modification are clearly shown in the aforecited Meyer article. A ground fault on any one of the wires included in the transmission path 120 would, of course, cause the one of the coils C0 through C4 connected thereto to be energized whereby the modified pattern 315 would provide an indication of the fault condition.

The principles of the present invention also extend to the case in which a transmission is made from one transceiver to a plurality of other transceivers. Thus, the illustrative system shown in FIG. 1 may, for example, be arranged to simultaneously transmit a set of information signals from the transceiver 100 to each of the two transceivers 140 and 240. This is accomplished by enabling the gate circuits 110, 130 and 230. To check the signals registered in the transceivers 140 and 240 the gate circuits 110 and 230 are then disabled. The gate circuit 300 is enabled and the checking circuit 310 then checks the signals registered in the transceiver 140 during a first checking interval of time. Subsequently, the gate circuit 130 is disabled and the gate circuit 230 is enabled to permit the signals registered in the transceiver 240 to be checked during a second checking interval of time. In this manner any number of transceivers to which information signals are simultaneously transmitted via the path 120 may be checked in sequence by the checking circuit 310.

In some instances in which information signals are simultaneously transmitted to a plurality of transceivers over a single transmission path, it may be necessary to check the information signals registered in the various receiving transceivers in a single checking interval of time, thereby to release the transmission path as quickly as possible to make it available to serve other transceivers. To accomplish this purpose the specific illustrative embodiment shown in FIG. 3 is arranged to simultaneously check the information signals supplied to a plurality of receivers.

Figure 3:
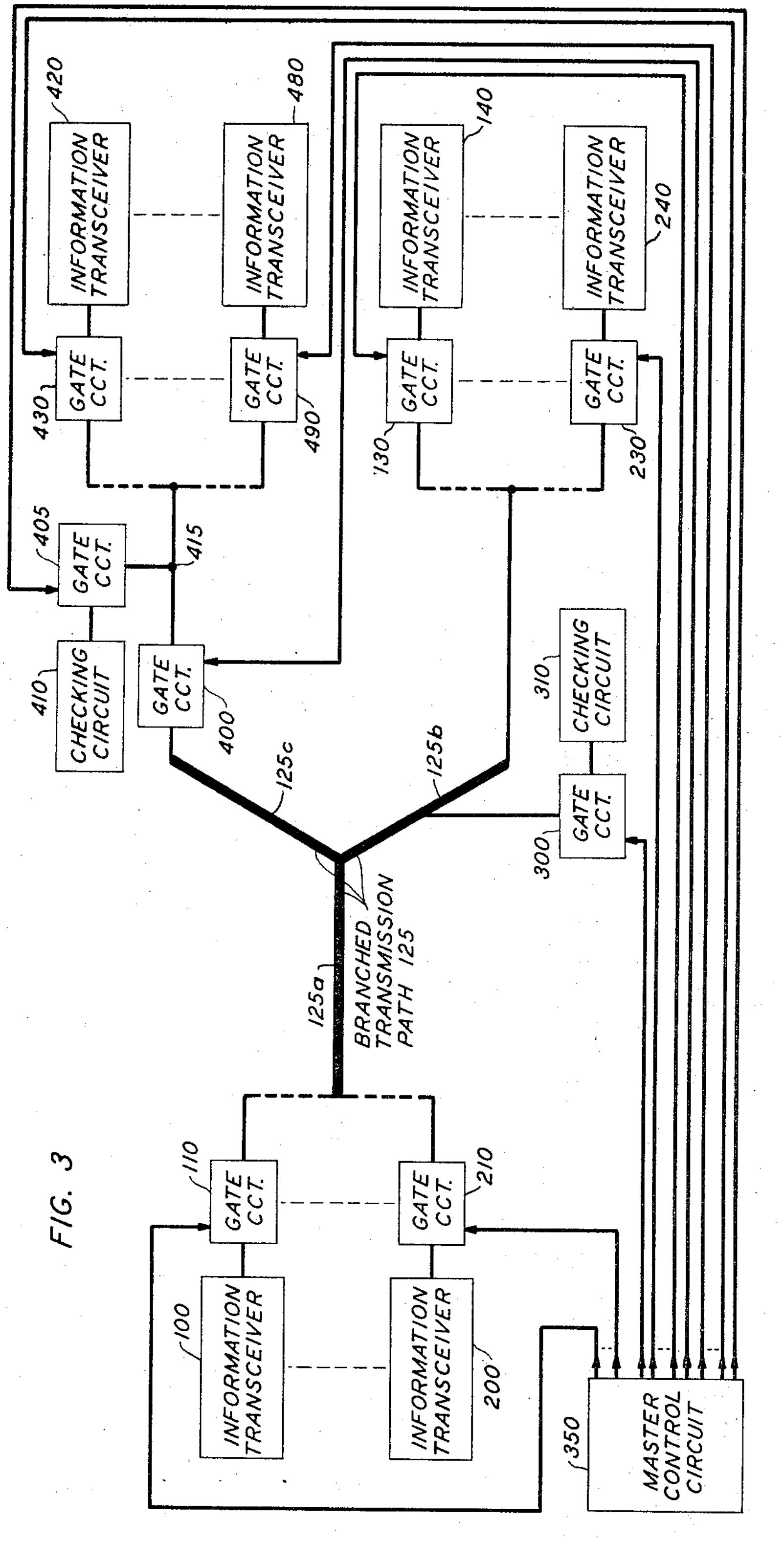
FIG. 3 depicts another illustrative embodiment of a system made in accordance with the principles of this invention.

The illustrative system depicted in FIG. 3 includes a branched transmission path 125 whose three branches are respectively designated 125*a*, 125*b* and 125*c*. The branches 125*a* and 125*b* and the circuitry directly connected thereto correspond exactly to the system illustrated in FIG. 1 and described hereinabove. Therefore, the individual components of the circuitry connected to the branches 125*a* and 125*b* are designated in FIG. 3 by the same reference numerals employed in FIG. 1.

The additional branch 125*c* shown in FIG. 3 is connected via a series-connected gate circuit 400 to a gate circuit 405 and its associated checking circuit 410. In turn, the junction 415 of the gate circuits 400 and 405 is connected to a plurality of transceivers 420 . . . 480 via respectively-associated gate circuits 430 . . . 490. By this arrangement it is possible, for example, to simultaneously transmit information signals from the transceiver 100 to the transceivers 140 and 420. To effect such a transmission requires the enablement of the gate circuits 110, 130, 400 and 430. Simultaneous checking of the signals registered in the transceivers 140 and 420 is carried out by disabling the gate circuits 110 and 400 and simultaneously enabling the checking gate circuits 300 and 405, whereby the checking circuits 310 and 410 provide simultaneous indications during a single checking interval of time of the conditions of the information signals registered in the transceivers 140 and 420 respectively.

Although particular attention herein has been directed to the use of relays and manually operable switches to form illustrative embodiments of the principles of the present invention, it is emphasized that the systems described herein may also be implemented by any of the electronic gating, switching, storing, sequencing and programing circuitry available in the art.

In addition, the principles of this invention are, of course, not limited to systems in which information signals are transmitted in a two-out-of-five code representation. Nor are these principles restricted to any particular form of checking circuitry. Furthermore, it is to be realized that the transmission paths described herein may either be links between remotely spaced locations or, alternatively, be interconnections between units in a single assemblage of equipment.

Moreover, although primary attention herein has been directed to systems which include bidirectional transmission paths, it is emphasized that the principles of the present invention are also applicable to a system which includes a unidirectional transmission path to which a checking circuit and its associated gate circuit are coupled.

Furthermore, it is to be understood that the above-described arrangements are only illustrative of the application of the principles of the present invention. Numerous other arrangements may be devised by those skilled in the art without departing from the spirit and scope of this invention.

What is claimed is:

1. Apparatus for supplying signals from a transmitter at certain specified intervals to one at a time of a plurality of receivers, said apparatus comprising a transmission path having one end connected to said transmitter and having the other end connectable to said receivers one at a time, a single circuit for checking but not adding in any way to the signals supplied from said transmitter to any of said receivers, and means for coupling only the input of said circuit to said path during a checking interval in which signals are not being supplied from said transmitter to any of said receivers, said means for coupling being adapted to directly connect said circuit in sequence to those receivers to which signals have been supplied from said transmitter thereby to determine whether or not signals registered in said receivers are accurate representations of the signals transmitted thereto.

2. Apparatus for supplying information signals having a predetermined characteristic from a transmitter at certain specified intervals to at least one at a time of a plurality of receivers, said apparatus comprising a transmission path having one end connected to said transmitter and having the other end connectable to at least one at a time of said receivers, a single circuit for checking the information signals registered in said receivers for the presence of said predetermined characteristic, and means for coupling the receivers which have information signals registered therein to said circuit in sequence during successive checking intervals in which information signals are not being supplied to said path by said transmitter.

3. An information processing system comprising a plurality of first information transceivers, a plurality of second information transceivers, a plurality of third information transceivers, first connecting means for connecting any particular one at a time of said first transceivers to any particular one at a time of said second transceivers, second connecting means for also connecting said particular one of said first transceivers to any particular one at a time of said third transceivers, first checking circuit means, first gating means for coupling said first checking circuit means to said first connecting means, second checking circuit means, and second gating means for coupling said second checking circuit means to said second connecting means.

4. A system as in claim 3 further including master control means for disabling said first and second gating means and then effecting a transmission connection via said first and second connecting means between a particular one of said first transceivers and respective ones of said second and third transceivers.

5. A system as in claim 4 wherein said master control means includes means for disconnecting said one of said first transceivers from said first and second connecting means subsequent to the completion of a transmisison among said transceivers and then for simultaneously enabling said first and second gating means to effect simultaneous checks on the information signals registered in said particular ones of said second and third transceivers.

6. In combination in an information processing system, a plurality of first and second information transceivers each operable to register information signals therein, an information transfer path having first and second ends, a plurality of first transceiver connector means respectively connected in series between said first transceivers and the first end of said path for effecting connections therebetween, a plurality of second transceiver connector means respectively connected in series between said second transceivers and the second end of said path for effecting connections therebetween, checking circuit means, and checking connector means interposed between said checking circuit means and said path for effecting a connection therebetween.

7. A combination as in claim 6 further including means for disabling said plurality of first and second transceiver connector means, connector control means for enabling said checking connector means subsequent to the disablement of said plurality of first and second transceiver connector means thereby to complete a circuit between said checking circuit means and said path to detect a trouble condition present on said path.

8. A combination as in claim 6 further including means for disabling said checking connector means, and means for controlling said first and second transceiver connector means subsequent to the disablement of said checking connector means to effect a connection via said transfer path between one of said first transceivers and at least one of said second transceivers to transfer information signals therebetween.

9. A combination as in claim 8 further including means for controlling said first transceiver connector means to disconnect said one particular first transceiver from said path following the completion of a transfer of information signals between said particular first and second transceivers and for controlling said checking connector means to complete a circuit via said path between said checking circuit means and said particular second transceivers to check the information signals registered therein.

10. In combination, a transmission path having two ends, an information transmitter, means for coupling said transmitter to one end of said path, a plurality of information receivers, means for coupling at least one of said receivers at a time to the other end of said path, a checking circuit, means for coupling said checking circuit to said path, said means for coupling said transmitter to one end of said path comprising a first gating circuit, said means for coupling at least one of said receivers at a time to the other end of said path comprising a second gating circuit, said means for coupling said checking circuit to said path comprising a third gating circuit, and means for selectively controlling said first, second and third gating circuits in sequence as follows:

disable said first, second and third gating circuits,
enable said first and second gating circuits while maintaining said third gating circuit disabled,
disable said first gating circuit while maintaining said second gating circuit enabled and said third gating circuit disabled, and
enable said third gating circuit while maintaining said first gating circuit disabled and said second gating circuit enabled.

11. In combination in an information processing system, a bidirectional transmission path having first and second ends, a plurality of first transceivers, first means for coupling said first transceivers one at a time to said first end of said path, a plurality of second transceivers, second means for coupling said second transceivers one at a time to said second end of said path, a checking circuit, third means for coupling said checking circuit to said path, and master control means for enabling said first means during a first interval of time to couple a particular one of said first transceivers to said first end of said path and for enabling said second means during said first interval of time to couple at least one particular one of said second transceivers to said second end of said path to effect a transmission coupling between said particular transceivers and for disabling said first means during a second interval of time to decouple said particular one of said first transceivers from said first end of said path and for enabling said third means during said second interval of time to couple said checking circuit to said path.

12. In combination, a transmission path having two ends, an information transmitter, means for coupling said transmitter to one end of said path, a plurality of information receivers each including means for registering received information signals, means for coupling said receivers one at a time to the other end of said path, a checking circuit, and means for coupling said checking circuit to said path and to said receivers in sequence only during a time interval in which signals are not being propagated along said path thereby to check the validity of signals registered in said receivers.

References Cited

UNITED STATES PATENTS

| | | | |
|---|---|---|---|
| 2,854,653 | 9/1958 | Lubkin | 340—146.1 |
| 3,005,189 | 10/1961 | O'Brien | 340—146.1 |
| 3,140,464 | 7/1964 | Rakoczi | 340—146.1 |

MALCOLM A. MORRISON, *Primary Examiner.*

C. E. ATKINSON, *Assistant Examiner.*